United States Patent [19]
Albanese et al.

[11] Patent Number: 6,108,566
[45] Date of Patent: Aug. 22, 2000

[54] HANDS-FREE MOBILE TELEPHONE

[76] Inventors: Thomas J. Albanese, 28 Kerri La., Pembroke, Mass. 02359; Scott D. Dalton, 25 Beverly Cir., Bridgewater, Mass. 02324

[21] Appl. No.: 09/046,056

[22] Filed: Mar. 23, 1998

[51] Int. Cl.$^7$ ........................................................ H04M 1/00
[52] U.S. Cl. ............................ 455/569; 455/99; 455/345; 379/420; 381/365
[58] Field of Search .............................. 455/569, 99, 345, 455/95, 90; 379/420, 455, 446, 454; 381/361, 363, 364, 365, 367

[56] References Cited

U.S. PATENT DOCUMENTS

| | | | |
|---|---|---|---|
| 4,151,468 | 4/1979 | Kerr | 455/575 |
| 4,215,250 | 7/1980 | Resener | 361/365 |
| 4,325,143 | 4/1982 | Kerr | 455/99 |
| 4,842,174 | 6/1989 | Sheppard et al. | 224/548 |
| 5,490,213 | 2/1996 | Huang | 379/442 |
| 5,613,222 | 3/1997 | Guenther | 455/90 |
| 5,668,869 | 9/1997 | Zinno | 379/449 |
| 5,687,230 | 11/1997 | Olausson et al. | 379/428 |
| 5,771,303 | 6/1998 | Mazzarella et al. | 455/99 |

*Primary Examiner*—Edward F. Urban
*Assistant Examiner*—Rafael Perez-Gutierrez
*Attorney, Agent, or Firm*—D. Michael Burns

[57] ABSTRACT

The present invention provides for permitting hands-free operation of a telephone handset in a vehicle. The device, having a base pivotally attached to the vehicle above the door opening on the driver's side, and also has means for storing the device above the door opening when not in use. Means are provided for wiring the device to the microphone input of the mobile phone set. A resiliently flexible elongated extension, having a coaxial cable being disposed therein, with a proximal end connected to the base and and a distal end containing a microphone. The extension connects the energy source to the distal end and is formed of a material that can be easily flexed by hand to assume a multiple of different shapes and angles, and which can retain a given shape indefinitely. The distal end is normally oriented towards the user's mouth when in position for use.

6 Claims, 2 Drawing Sheets

HANDS-FREE MOBILE TELEPHONE

BACKGROUND OF THE INVENTION

1. Field of the Invention

The present invention relates to a hands-free telephone which is mounted in a motor vehicle, preferably in a readily handy position for easy positioning to the mouth of the user. The invention will eliminate reverberations and other noises common to motor vehicles.

2. Description of the Prior Art

The present invention is for a telephone microphone to be positioned close to the mouth of the user. The microphone is built into a flexibly elongated extension arm and the user can, by hand, position the microphone which will then maintain the position indefinitely. The invention can be safely and securely retained when not in use.

There is prior art for hands-free microphones, whether it be their use in vehicles or in other applications. It is also well known to use a flexible conduit, one that can be manually fixed into a desired shape and having a microphone built into the distal end. One such arrangement is found in courtrooms, more specifically, in the witness stand. Another application area can be found with hands-free microphones used with computers. Yet, none of the prior art teaches the use of a hands-free telephone microphone which is designed to be used close to the mouth in a motor vehicle and then safely stored away when not in use.

U.S. Pat. No. 5,668,869 issued to Zinno on Sep. 16, 1997, teaches the use of a mobile telephone hands-free holder that provides the user a hands-free environment, whereby the handset is clipped to the shoulder strap of a seat belt. The holder is slidably mounted and can be adjusted to fit the physical size of the user. The present invention does not require the use of a seat belt and has far less moving parts.

U.S. Pat. No. 5,490,213 issued to Huang on Feb. 6, 1996, discloses an apparatus for a hands-free mobile telephone unit in an automobile. This patent by Huang does not however teach a means for providing a microphone that is to be used close to the mouth of the user, in order to eliminate vehicle noises, echoes and reverberations that are inherent in all automobiles.

U.S. Pat. No. 4,842,174 issued to Sheppard et al. on Jun. 27, 1989, teaches a mounting apparatus that utilizes a flexible, tubular support arm for holding the hand set. Although the use of a flexible tube is taught by Sheppard et al., this invention does not teach the use of a hands-free microphone. Also the safety element, which is the most important consideration of the present invention, is not addressed. The invention of Sheppard still requires the operator to drive the vehicle with one hand while using the telephone.

None of the above inventions and patents, take either singly or in combination, is seen to describe the instant invention as claimed.

SUMMARY OF THE INVENTION

The present invention provides a telephone with a hands-free microphone, which is attached to the interior of a vehicle, and is in a close relationship to the mouth of the user. This offers major advantages in audio clarity and safety, as will as inherent construction efficiencies. The hands-free telephone microphone is built into the distal end of a flexible, yet rigid, elongated extension piece. The proximal end of the elongated extension is pivotally connected to a base housing, which is fastened to the interior of the vehicle immediately above the drivers door opening. The extension piece has a coaxial cable extending longitudinally within it. Strands of copper wrap the coaxial cable and give the extension its flexibility, yet still providing the rigidness necessary to maintain the extension shape for an indefinite time. Means for securing the device over the door on the drivers side of the vehicle, when the device is not in use, is also provided. When needed by the user, the microphone can be instantly positioned close to the mouth which will eliminate any of the interior noises and reverberations.

Accordingly, it is a principal object of the invention to provide an enhanced hands-free operation of a mobile telephone, whereby there exists virtually no audible difference between the hands-free operation of the present invention and that which one would get using a private (handset) mode.

It is another object of the invention to provide a hands-free microphone that will eliminate the echo and reverberation effects, by locating the microphone as close as possible to the mouth of the user.

It is a further object of the invention to provide a hands-free microphone that will be a safer and more convenient way to speak while driving, and without sacrificing sound quality.

Still another object of the invention is to provide a means for allowing the microphone to be flexibly positioned by hand yet still having the rigidity necessary to maintain the position indefinitely.

It is an object of the invention to provide a means for securing the device safely from the driver, yet still being conveniently accessible when needed.

These and other objects of the present invention will become readily apparent upon further review of the following specification and drawings.

DETAILED DESCRIPTION OF THE PREFERRED EMBODIMENT

Figure 1:
FIG. 1 is an environmental view of the device in use.
Figure 2:
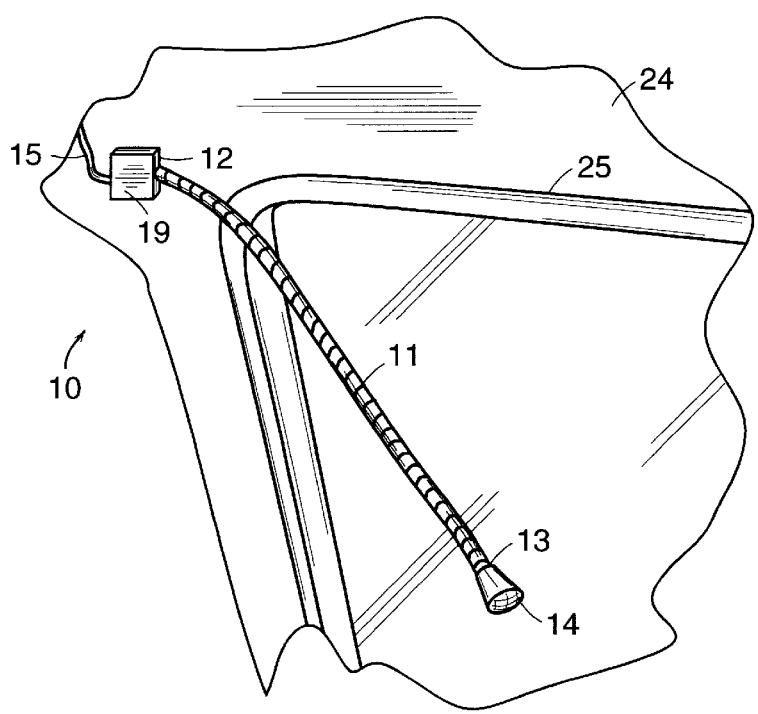
FIG. 2 is an environmental of the device as mounted in a vehicle.
Figure 3:
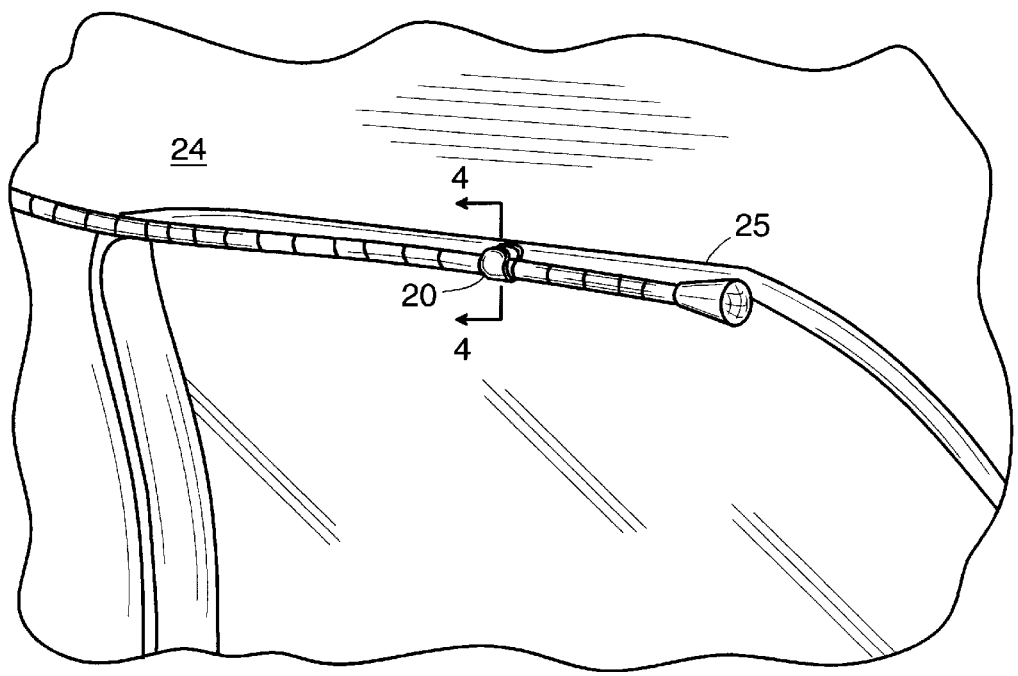
FIG. 3 is an environmental view of the device in the stored position.
Figure 4:
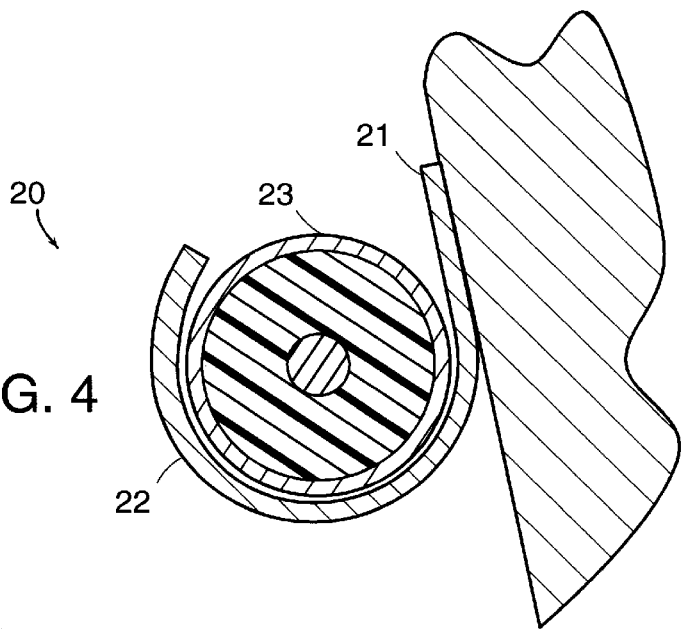
FIG. 4 is a sectional view of the retainer clip taken alongline 4—4 of FIG. 3.
Figure 5:
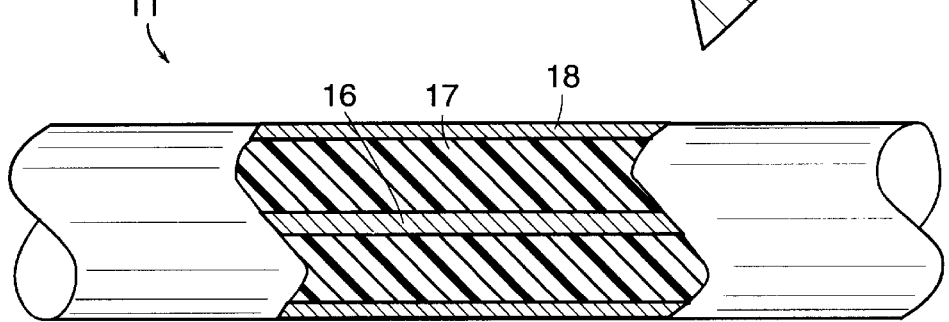
FIG. 5 is a sectional view of the extension arm.

The present invention is a hands-free microphone for a cellular (mobile) telephone device 10 for use in a motor vehicle as generally shown in FIGS. 1–3. One of the biggest concerns of using cellular phones in vehicles is the lack of safety which exists when a driver holds the phone handset with one hand, while proceeding to drive the vehicle with only the other hand. Another concern is the lack of clarity caused by reverberation and echo effects which are inherent when any of the prior art hands-free microphones are used in motor vehicles. FIGS. 1 and 2 show the invention in use, with the device 10 comprising an elongated, flexible extension arm 11 which has two opposing ends, a proximal end portion 12 which is pivotally connected to a base housing 19 and a distal end portion 13 which has an integrally attached microphone 14. The proximal end 12 can be connected to the base housing by several conventional ways. One manner of connection, which is utilized by the preferred embodiment is a conventional ball-socket attachment wherein the proximal end portion 12 is spherical in shape and fits within a socket formed within the base housing 19. Another method would have the proximal end 12 pivotally sliding in a groove which would extend vertically within the base housing 19. Other known methods, as long as they allowed the extension arm 11 to pivot, would be equally as effective. The extension 11 is allowed to pivot into and out of position to create better flexibility and longer life. FIG. 5 shows the extension arm 11, further comprising a longitudinally extending inner core of coaxial cable 16 which is wrapped with strands of copper wire 17 and then coated with an elasticized material 18, all of which provide the extension arm 11 with both flexibility as well as rigidness. The degree of flex and the resistance to flex of the extension arm 11 is determined by a combination of the gauge of the coaxial cable 16, the spacing between the strands of copper wire 17, the composition and density of the elastomeric material 18 used to cover the arm 11 and in part to the overall thickness of the extension. The coaxial cable 16 carries the electrical signal from the microphone 14 to the base 19 where it is relayed to a mobile phone hands-free microphone input by an electrical wire 15. The extension arm 11 can be easily flexed by hand to any shape or angle, yet it is rigid enough to maintain that shape indefinitely. The thickness of the extension arm 11 should be relatively thin so as not to be an interfering obstacle to the driver's vision or his maneuverability. In the preferred embodiment the dimension of the extension will be approximately 0.25–0.50 inches.

The elastomeric material encapsulating the extension arm 11 can be made from a multitude of materials, such as rubber or a metal conduit or even a telescoping metal shaft having a ball and socket at each end.

The base housing 19 has a generally rectangular or square shape and is anchored to the interior panel 24 near the top edge of the driver's door 25. The base 19 is fastened to the interior panel 24, with either clips or a plurality of screws. Either fastening method will work equally well. The base portion 19 is made of plastic as in the preferred embodiment but metal or a composite material could also be used.

In operation the user merely has to flex the extension arm 11 into the most convenient and comfortable working position, with height and body size being important considerations. By placing the microphone 14 close to the mouth, the noises inherent to the vehicle are virtually eliminated. These noises consist of echoes and reverberations which are very noticeable to any person on the listening end of a call from a hands-free handset. The present invention affords the receiving party the same clarity as if the call were actually being made using a private handset.

When the driver is not using the device 10 it can be retained in the interior panel 24, above the door opening 25 as shown in FIG. 3, by means of a retainer clip 20. FIG. 5 shows the retainer clip 20 having a vertically extending and generally straight portion 21 and a resilient semi-circular curved holding arm 22, which is parallel to the door opening 25, and defines a groove 23 therein. This groove will accept the extension arm 11 when the device 10 is in the stored position. The extension arm can be biased into the groove by pushing the extension arm through the opening causing the resilient to deflect. This allows the device 10 to be safety stored out of the way, yet handy when needed. The straight portion 21 can be attached by any conventional known means such as adhesives or a plurality of screws. The preferred embodiment utilizes a double-backed adhesive strip. The device 10 will decrease static, echo and reverberation but will increase safety, as the user will now have both hands available for operating the vehicle.

It is to be understood that the present invention is not limited to the sole embodiment described above, but encompasses any and all embodiments within the scope of the following claims.

We claim:

1. The device for permitting hands-free operation of a mobile telephone in a motor vehicle comprising:

an elongate extension arm having opposing ends, a proximal end portion and a distal end portion;

a microphone integrally attached to the distal end portion of the extension arm;

an elastomeric base housing rigidly attached, conveniently positioned and oriented to an interior panel of the motor vehicle, the interior panel being above a door opening on the driver's side of the vehicle; the proximal end portion having means for being pivotally connected to the base housing;

the elongate extension arm being a flexible arm formed of a coaxial cable wrapped with strands of copper wire and encapsulated with an elastomeric coat;

a retaining clip mounted on the interior surface of the motor vehicle above the door opening, a measured distance from the base housing, no further than the length of the elongate extension arm;

the retain ing clip comprising a generally straight and vertically extending portion and a generally semi-circular resilient holding arm;

the vertically extending portion having means to affix the retaining clip to the interior surface of the vehicle;

the resilient holding arm having defined within its inner surface a groove;

the groove being of a size sufficient to accept the extension arm when the extension arm is biased into the groove whereby the extension arm is then in a stored position;

the extension arm being formed in such a way that it can be easily flexed by hand to assume a multitude of different shapes and can retain a given shape indefinitely;

whereby an electrical signal from the microphone flows through the extension arm to the base housing and then relayed to a H/F microphone input; and wherein the microphone can be positioned in a close working relationship to the mouth of the user so as to eliminate virtually all echo and reverberation.

2. The device according to claim 1 wherein the means for affixing the retainer clip to the vehicle is a double-backed adhesive strip.

3. The device according to claim 1 wherein the base housing and retainer clip are formed of a plastic material.

4. The device according to claim 1 wherein the base housing and retaining clip are made from a metal material.

5. The device according to claim 1 wherein the outer encapsulating coat is of a rubber material.

6. The device according to claim 1 wherein the outer encapsulating coat is a metal conduit.

* * * * *